May 24, 1955  E. E. MARTIN  2,709,118
SEALS FOR PISTONS AND THE LIKE
Filed Feb. 7, 1955   2 Sheets-Sheet 1
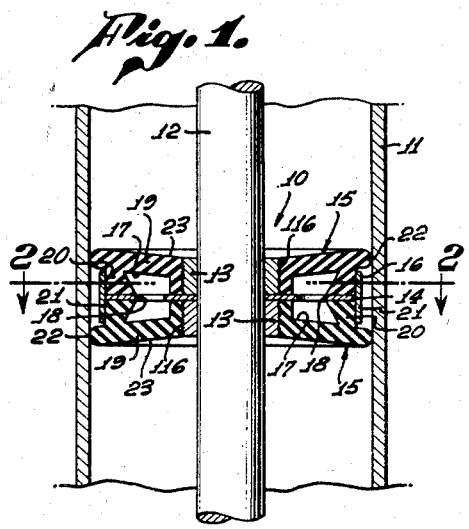
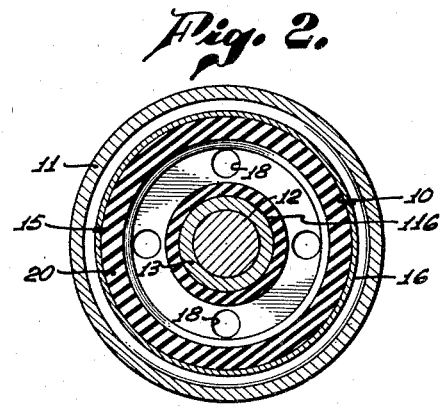
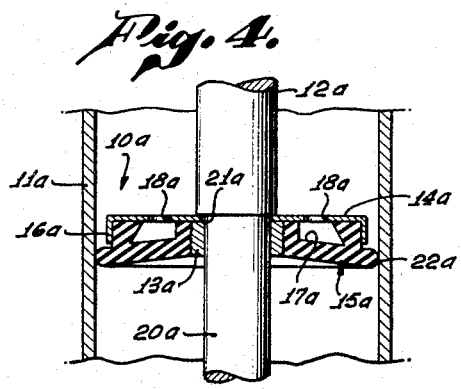
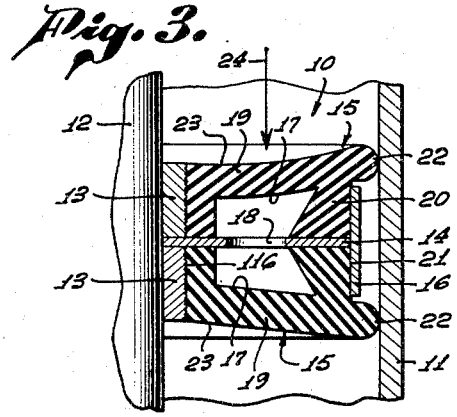
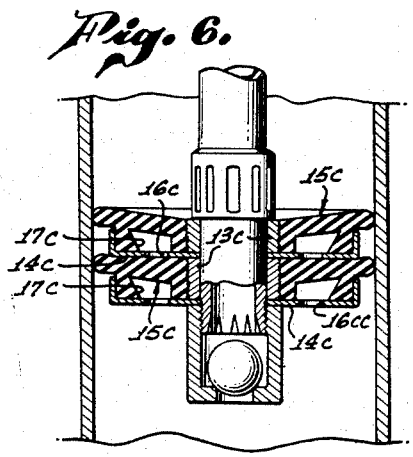
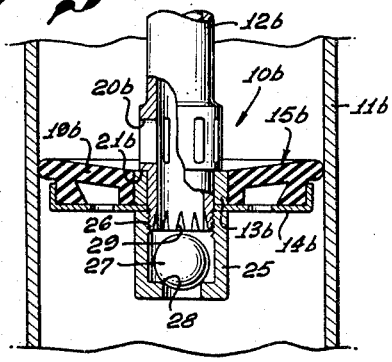
INVENTOR.
EARNEST E. MARTIN,
BY
ATTORNEY.

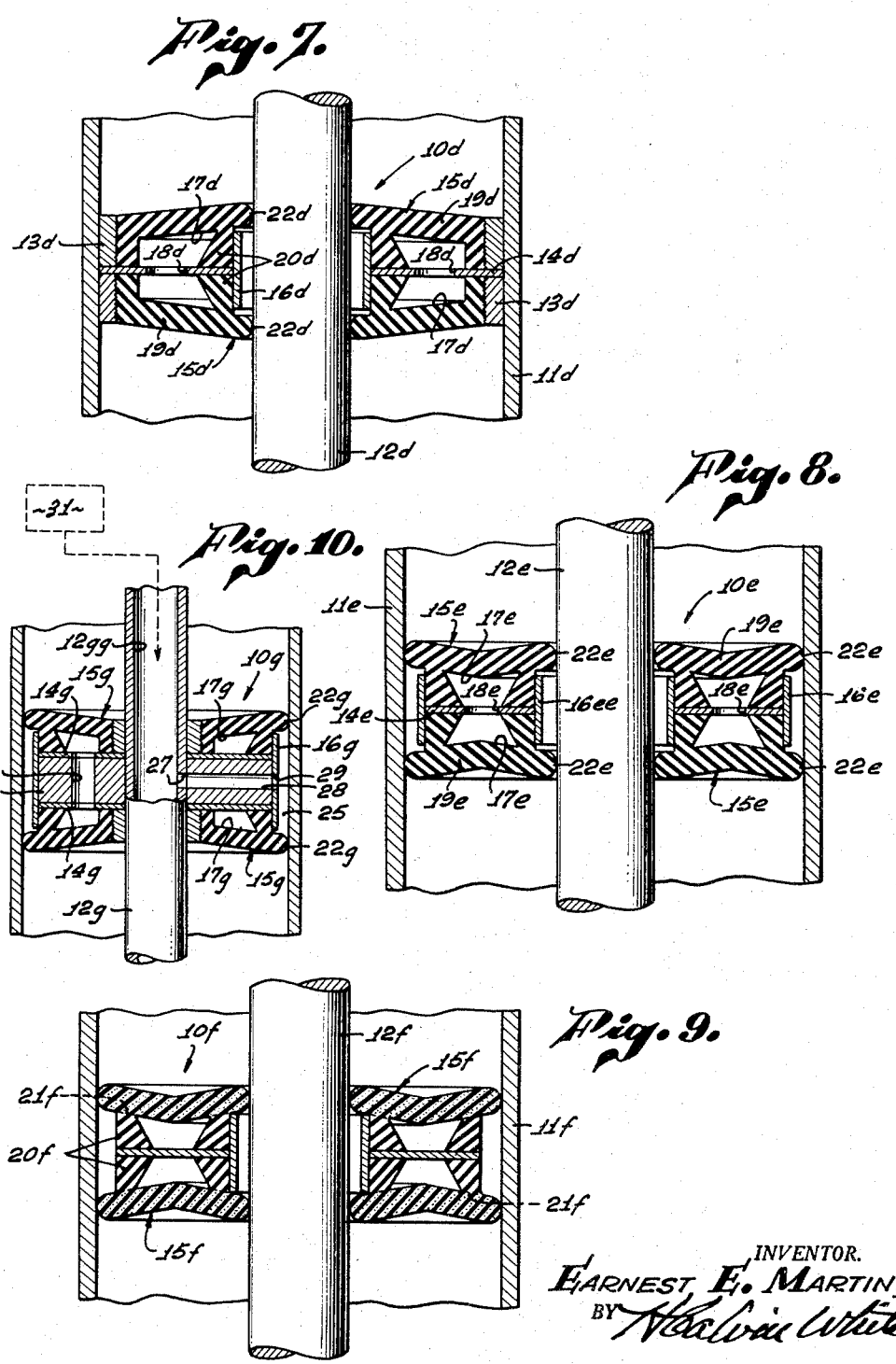

United States Patent Office 2,709,118
Patented May 24, 1955

2,709,118
SEALS FOR PISTONS AND THE LIKE

Earnest E. Martin, Glendora, Calif., assignor to Ralph W. Walsh, Westminster, Calif.

Application February 7, 1955, Serial No. 486,618

21 Claims. (Cl. 309—23)

This invention relates to improved means for forming a fluidtight seal between a piston and a cylinder wall, or between other fluid sealing elements one of which is to be movable axially within or relative to the other. Without intending to limit the scope of the claims, but merely to simplify the description, the discussion will be directed mainly to the application of the invention to piston construction.

Pistons or seal members embodying the invention are of a type in which the body of the piston, or at least a substantial portion of the body, is formed of an elastomeric material such as rubber, and that body material forms or carries an annular sealing lip for engaging and forming a seal with the cylinder or its equivalent. In the past, pistons of this general type have been less satisfactory than would be desired by reason of the difficulty of maintaining a proper seal under varying pressure conditions, while at the same time assuring against excessive friction or binding. More specifically, when the pressure against a rubber bodied piston or seal member increases, the pressure tends to expand the rubber radially against the cylinder wall in a manner greatly increasing the frictional resistance of the piston, and thus rendering the mechanism very inefficient if not entirely ineffective for the intended purpose.

The general object of the present invention is to provide a piston or seal member which has a substantial portion of its body formed of elastomeric material, and yet which can function very effectively over a wide range of pressures without excessive frictional drag. For this purpose, the device is so designed that the fluid pressure will actually exert a force tending to pull the elastomeric material radially away from the cylinder or other engaged member to thus counteract the normal tendency for expansion against that member upon increase in pressure, and to thereby prevent the development of excessive frictional drag. This counteracting force is produced in very unique manner by designing the elastomeric material to form an essentially radially extending elastic wall, which is flexed or deflected axially by the fluid pressure, and in being flexed exerts the desired radial force on the cylinder engaging lip of the device. The lip carrying portion of the body is restrained against axial flexure with the resilient wall, and being connected to an edge of the wall, is automatically pulled in a radial direction when the wall flexes. The body may be so dimensioned that this radial force will almost exactly counteract the tendency for expansion, within the pressure range for which the device is designed, so that the same almost constant but very light sealing force is exerted by the sealing lip against the engaged wall or surface at all operating pressures. As will appear, the same effect may also be attained where the seal member, instead of being a piston within a cylinder, is an annular seal unit disposed about a rod, and having a radially inner sealing lip engaging the rod.

The elastomeric material may contain a recess adjacent the flexible wall, for allowing flexure of the wall, and may be backed up by an essentially radial backing plate acting to resist flexure of the lip carrying portion of the piston or seal unit with the wall. In many instances, two elastomeric seal bodies are provided at opposite sides of the backing member, each having a sealing lip and flexible wall, and containing a recess. The two recesses in the two bodies may then be placed in communication through an opening in the backing member, so that the compression of air in one recess upon flexure of the wall tends to expand the other elastomeric body and assure its proper sealing engagement with the cylinder. At the location of the recesses, the elastic body may be positively retained against radial expansion, typically by a ring disposed about and confining the body material. Also, where the device is a piston, the radially inner portions of the elastic bodies are desirably bonded or otherwise positively secured in fixed relation to the mounting hub structure.

The above and other features and objects of the present invention will be better understood from the following detailed description of the typical embodiments illustrated in the accompanying drawing, in which:

Fig. 1 is a section through a piston and cylinder apparatus, in which the piston is constructed in accordance with the present invention;

Fig. 2 is a transverse section taken on line 2—2 of Fig. 1;

Fig. 3 is an enlarged fragmentary section corresponding to Fig. 1, but showing the piston in the condition to which it is deformed when fluid pressure is applied to the piston;

Fig. 4 is a view corresponding to Fig. 1, but showing a variational form of piston;

Fig. 5 is an axial section through a well pipe swabbing device constructed in accordance with the invention;

Fig. 6 is a view corresponding to Fig. 5, but showing a slightly variational form of swab; and Figs. 7, 8, 9 and 10 are sectional views through four additional embodiments of the invention.

Referring first to Figs. 1 to 3, I have there shown a piston unit 10 formed in accordance with the invention, and illustrated in operative position within an associated cylinder 11. The piston structure is carried about an externally cylindrical piston rod 12, and is movable axially with the rod relative to the cylinder. In use, fluids in the cylinder at opposite sides of the piston may exert substantial pressure axially against the piston, which pressure may vary within a very substantial range.

The piston is formed of a number of annular parts, including two inner hub elements or sleeves 13, a reinforcing plate 14, two body members 15 formed of elastomeric material such as rubber, and an outer confining ring 16. Hub elements 13 are rigid, typically being formed of metal and may be pressed fits on rod 12, to be frictionally held in fixed positions relative to the rod. The outer essentially cylindrical surfaces 116 of elements 13 may be serrated or otherwise irregularized (see Fig. 3) with elastic body members 15 being vulcanized directly and continuously to these serrated surfaces. Such vulcanizing of the elastic bodies to elements 13 positively bonds the inner portions of bodies 15 in fixed relation to elements 13 and the piston rod.

Backing plate 14 is annular and rigid, typically being formed of rigid metal and extends radially outwardly from a location between the two elements 13. The two elastic bodies 15 are positioned at opposite sides of backing plate 14, to be retained thereby in essentially their illustrated positions. Each of the bodies 15 contains an annular recess 17 facing axially toward the corresponding recess in the other body 15, and communicating therewith through apertures 18 in backing plate 14. By virtue of the provision of these recesses 17 within the bodies 15, these bodies form a pair of essentially radially extending elastic annular walls 19, which are adapted to be flexed axially inwardly toward recess 17 by fluid pressure exerted against the opposite axial sides of piston assembly 10. Radially outwardly beyond recesses 17 the elastic bodies 15 have annular portions 20 which extend axially along the outer side of recesses 17 and into direct abutting engagement with backing plate 14, so that the walls 19 axially adjacent recesses 17 are free for greater axial flexure by the pressure fluid than are the outer portions of bodies 15 which directly bear against plate 14.

Portions 20 of elastic bodies 15 preferably are of essentially the illustrated cross-sectional configuration, having radially outer cylindrical surfaces 21, and being of progressively increasing radial thickness as they approach axially toward their points of engagement with backing plate 14. Each of the elastic bodies 15 forms an annular sealing lip 22 projecting outwardly beyond the diameter of surfaces 21, and forming essentially outward continuations of walls 19. Lips 22 may be of the illustrated outwardly convex cross-sectional configuration and annularly engage the inner surface of cylinder 11 at two axially spaced locations in fluidtight sealing relation. The ring 16 is preferably a cylindrical rigid sleeve, which extends about bodies 15 and plate 14 axially between sealing lips 22 and confines the axially extending portions 20 of bodies 15 against radial expansion. Preferably, the axially outer surfaces 23 of elastic bodies 15 are slightly concave, as shown, so that the two flexible walls 19 converge slightly as they extend radially inwardly toward rod 12.

When the piston 10 of Fig. 1 is in use, the piston and rod 12 of course reciprocate axially within cylinder 11, with the annular engagement of lips 22 with the cylinder serving to prevent leakage of fluid axially past the piston. At some points during the operating cycle of the piston, considerable fluid pressure is exerted against one or both of the sides of the piston. If the piston constituted merely a solid plug of rubber or other elastomeric material the exertion of such fluid pressure against one axial side of the piston would cause the rubber to expand radially outwardly against the wall of cylinder 11, so that the frictional drag on the piston would vary with the amount of pressure, and as the pressure increased might become sufficiently great to cause sticking or binding of the piston. The special formation of my piston as shown in Figs. 1 to 3, overcomes this tendency of rubber bodied pistons, by providing for a counteracting radially inward force against the cylinder engaging lips 22. More specifically, assume the exertion of a very substantial fluid pressure downwardly against the upper side of piston 10, as indicated by the arrow 24 in Fig. 3. This downward force causes the radially extending wall 19 above the two recesses 17 to resiliently flex downwardly to a slight extent, as to the condition represented in Fig. 3, the flexure being permitted by the fact that the wall is of a flexible material and is axially opposite one of the recesses 17. Radially outwardly beyond wall 19, the upper of the two elastic bodies 15 has a portion 20 which bears against rigid backing plate 14, and thus is less free for axial flexure or deflection than is wall 19. As a result of the fact that the portion of body 15 adjacent recesses 17 thus flexes axially to a greater extent than the outer portion of that body 15, there is a tendency for the axial flexure of wall 19 to pull inwardly on the connected sealing lip 22. The material of body 15 and its various dimensions are so selected that this tendency for inward movement of lip 22 is just sufficient to counteract the opposite tendency for radial expansion of lip 22 outwardly against cylinder 11 such as must occur from the mere fact that fluid pressure is exerted axially against the flexible piston body. In a preferred form of the device the thickness of wall 19 and the other dimensions of the various parts may have the same proportions shown in Figs. 1 and 3. The body 15 may be of rubber having a hardness between about 65 and 75 shore, preferably about 65 shore.

It is noted that the confinement of bodies 15 between lips 22 and ring 16, and the positive bonding or attachment of the inner portions of bodies 15 to hub elements 13, serves to confine the bodies 15 in a manner facilitating the application of the above described stabilizing forces to lips 22. Also, the provision for placing the two recesses 17 in communication through apertures 18 allows for communication of the slightly increased pressure in the upper recesses 17 as the result of flexure of the upper wall 19, to the lower recesses 17, with a resultant slight tendency to expand the lower body 15 when pressure is applied downwardly against the upper body 15 to thus automatically assure maintenance of an effective seal at the lower lip 22. Also, the increase in pressure within the lower recess acts to flex the lower wall 19 downwardly, which flexure tends of itself to actuate lower lip 22 slightly outwardly to form a good seal. The reverse action of course occurs when pressure is applied upwardly against the bottom of the piston. All in all, with a piston of the above described construction, lips 22 serve to form a very effective and tight fluid seal with cylinder 11 through a very wide pressure range, and without the development of any substantial frictional drag on the piston at any point in that pressure range.

Fig. 4 illustrates a variational form of piston 10a embodying the invention and shown positioned within a cylinder 11a. This piston 10a is carried about a rod 12a, and is similar to the piston shown in Fig. 1 except that only one hub element 13a and elastic body 15a is provided. These parts 12a and 15a may bear against a backing plate 14a corresponding to plate 14 of Fig. 1 and having apertures 18a. In the Fig. 4 arrangement, instead of forming outer ring 16 separately, this ring may comprise an axially turned annular portion 16a of backing plate 14a. Hub element 13a is a pressed sheet on a reduced portion 20a of rod 12a, and is pressed upwardly to a position at which it holds backing plate 14a tightly against a shoulder 21a on the rod.

The piston of Fig. 4 functions substantially the same as the piston of Fig. 1 when pressure is applied upwardly, but is not adapted or intended to form an effective seal when pressure is applied downwardly. In the Fig. 4 arrangement, upward fluid pressure causes the radially extending portion of body 15a adjacent annular recesses 17a to flex upwardly in a manner tending to pull sealing lip 22a radially inwardly, and thus counteracting the normal tendency for the pressure fluid to expand lip 22a radially outwardly, so that under variable pressure conditions a substantially constant and very light sealing force is exerted outwardly by the sealing lip. As in Fig. 1 body 15a is preferably vulcanized directly to an outer corrugated surface of hub element 13a and in other respects the features mentioned in connection with Fig. 1 are applied to the Fig. 4 form of the invention where applicable. Backing plate 14a may contain apertures 18a for placing recess 17a in communication with the upper side of the piston.

Fig. 5 shows another variational form of the invention, comprising a swab 10b rather than a piston, the swab being utilized for lifting liquid upwardly within a well casing or other tubular structure 11b. In Fig. 5, the swab includes a hub element 13b, elastic member 15b and backing plate 14b which correspond to and function in the same manner as parts 13a, 15a and 14a respectively of Fig. 4. These elements are carried about a tubular vertically extending member 12b, which is actuated vertically from the surface of the earth (where 11b is a well casing), and which has lateral openings 20b in its wall above the swabbing parts. Parts 13b, 14b and 15b are tightened upwardly against a shoulder 21b on tubular body 12b by means of a lower tubular member 25 threadedly connected to member 12b at 26. Member 25 contains a ball check valve 27, which seats downwardly on a seat surface 28 in member 25 to prevent downward flow of liquid through the swab structure. The ball check valve 27 is adapted to move upwardly off of seat 28 when the apparatus is moved downwardly within the well liquid, so that the liquid may flow upwardly past valve 27 and through body 12b and its apertures 20b to a location above body 15b. When the apparatus is then subsequently elevated, valve 27 closes to prevent downward flow of liquid through the swab structure and thus allow the apparatus to lift liquid upwardly within casing 11b.

Upward movement of valve 27 may be limited by engagement with the lower end of member 12b which may have grooves 29 cut in its lower ball engaging end to allow for free flow of liquid upwardly past the ball. As will be understood during the upstroke of the swabbing apparatus shown in Fig. 5, the upper laterally extending wall 19b of body 15 flexes downwardly in the manner previously described in conjunction with the other forms of the invention, to exert the desired inward force against lip 22a, and thus counteract any tendency for radial expansion of the lip and the excessively tight gripping engagement with casing 11b.

Fig. 6 illustrates an additional form of the invention and is the same as that shown in Fig. 5 except that two of the elastic bodies 15c, and associated parts 13c and 14c, are provided instead of a single set of these sealing parts. Apertures 16c in the upper of the two backing plates 14c allow the pressure developed within recess 17c of the upper body 15c to be communicated to the upper side of the lower body 15c (that pressure of course being developed by flexure of the radial wall of the upper body 15c). Apertures 16cc in the lower backing plate communicate the pressure or vacuum at the under side of the piston to the lower recess 17c.

Fig. 7 illustrates another form of the invention, which is utilized for forming a fluidtight seal with an axially or rotatively movable shaft 12d. The seal assembly 10d is mounted stationarily to an outer carrier body, which may comprise a cylindrical or tubular element 11d. As will be apparent, the seal assembly 10d is very similar to the piston shown at 10 in Fig. 1, except that the two elastic bodies 15d have their annular sealing lips 22d formed at the radially inner portion of the seal assembly, to be slidably engaged by the relatively movable shaft 12d, rather than having the lips formed at the outer extremity of the unit as in Fig. 1. Elastic bodies 15d are bonded to a pair of radially outer rigid rings 13d, which are pressed fits within tubular body 11d. Between one of the pairs of elements 13d and 15d, and the other pair of elements 13d and 15d, there is provided a rigid radially extending backing plate 14d, containing apertures 18d for placing in communication the two inner annular recesses 17d within bodies 15d. Radially inwardly of the axially extending portions 20d of elastic bodies 15d, there is provided a cylindrical rigid inner ring 16d, which corresponds essentially to ring 16 of Fig. 1, except that ring 16d retains elastic body portions 20d against radially inward movement, rather than radially outward movement as in the case of ring 16 in Fig. 1.

In using the seal structure shown in Fig. 7, the two sealing lips 22d annularly engage shaft 12d, and form an effective fluidtight seal with that shaft even though the latter may be moved. If an increased fluid pressure is applied to either the upper or lower side of seal unit 10d, that pressure tends to axially flex the radially extending wall 19d of a corresponding one of the elastic bodies 15d, and by such flexure tends to pull the connected seal lip 22d radially outwardly, to thus counteract the tendency of the lip to tighten inwardly about shaft 12d as a result of the increased pressure. Thus, as in the previous forms of the invention, an effective but low friction seal is maintained over varying pressure conditions. Preferably, the seal unit 10d increases in axial extent as it approaches shaft 12d, as will be apparent from the drawing.

Fig. 8 represents a form of the invention in which the seal unit 10e is not fixed to either the outer cylinder 11e or the shaft 12e, but is entirely free to float axially with respect to both of these elements. In this form of the invention, the elastic bodies 15e have sealing lips 22e at both their inner and outer extremity for slidably and annularly engaging in fluid sealing relation both the outer body 11e and inner shaft 12e. As in the other forms of the invention, a rigid backing ring 14e is provided between bodies 15e. The axially extending portions of the bodies 15e are retained against radial expansion by an outer rigid ring 16e and are retained against inward flexure by an inner rigid ring 16ee. Annular recesses 17e are formed within bodies 15e, and are placed in communication through openings 18e in plate 14e. In this Fig. 8 arrangement, the exertion of fluid pressure against either side of unit 10e acts to axially flex one of the radially extending walls 19e, and this flexure tends to simultaneously pull both of the associated lips 22e away from the engaged elements 11e and 12e, to thus counteract the tendency for too tight engagement with those elements.

Fig. 9 represents a form of the invention in which the floating seal unit 10f is movable relative to parts 11f and 12f as in Fig. 8, but in which the elastic bodies 15f are so formed as to eliminate the necessity for an outer ring corresponding to that shown at 16e in Fig. 8. More specifically, in Fig. 9, the outer axially extending portions 20f of elastic bodies 15f are formed of a considerably less flexible rubber or other elastic material, so that these portions 20f have sufficient stiffness or rigidity to themselves resist outward expansion without the necessity for a retaining ring. Preferably, the relatively stiff but still somewhat flexible material forming portions 20f is vulcanized directly to the more flexible material forming the rest of bodies 15 along the broken lines indicated at 21f.

Fig. 10 shows a final form of the invention, comprising a piston 10g which is in many respects the same as the piston 10 of Fig. 1. This Fig. 10 piston differs from the Fig. 1 arrangement in the provision of means for feeding a lubricating oil or other liquid through a passage 12gg in rod 12d and radially outwardly through the piston to the space 25 at the outside of the piston and axially between sealing lips 22g. To allow for such feeding of liquid into space 25, there may be provided two radially extending rigid reinforcing rings 14g, axially between which there is received an annular body of material 25 typically formed of rubber. The liquid flowing from passage 12gg in the piston rod passes radially outwardly through an opening 27 in the wall of the piston rod, then through the radially extending passage 28 in ring 26, and through an opening 29 in outer ring 16g, and thus into the outer annular space 25. The annular recesses 17g within elastic bodies 15g are placed in communication by registering apertures 30 extending through rings 14g and 26 at locations offset circularly from the radially extending lubricant passage 28.

When the piston of Fig. 10 is in use, lubricant or other liquid may be fed through the rod and piston passages into the space 25 at the outside of the piston, and this space 25 may be maintained filled with liquid and somewhat pressurized by the liquid at all times. This liquid then serves to effectively lubricate the engaging portions of the piston and cylinder, and the maintenance of the pressurized condition within space 25 tends to facilitate the maintenance of an effective fluidtight seal. The liquid may be fed to the piston rod and piston by any suitable pump, diagrammatically represented at 31. The flexure of the radially extending walls of bodies 15g in Fig. 10 of course serves the same function as the axial flexure of the corresponding walls in the previous forms of the invention. It is also noted that the passages 30 allow the pressure developed in one annular recess 17g to be transmitted to the other recess, without placing either of these recesses in communication with the liquid being fed to space 25.

I claim:

1. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at an opposite side of said wall allowing axial flexure of the wall by said pressure fluid, said body of elastomeric material having a second portion connected to one radial extremity of said wall and carrying a sealing lip adapted to annularly and slidably engage a surface of said coacting member, and means restraining axial flexure of said second portion of the body to an extent such that said second portion is less free than said wall for axial flexure, whereby said wall when axially flexed by the pressure fluid tends to apply a radial force to said second portion of the body in a direction away from said coacting member to thereby counteract the tendency of the body to be pressed radially against the member by the fluid.

2. A fluid sealing unit as recited in claim 1 in which said restraining means comprise an essentially radially extending backing member axially supporting said second portion of the body but not said flexible wall portion thereof.

3. A fluid sealing unit as recited in claim 1 in which said second portion of the body and said lip are connected to the radially outer extremity of said flexible wall for engaging a tubular coacting member within which the unit is contained, said unit including a hub element to which a radially inner portion of said body is attached in fixed relation.

4. A fluid sealing unit as recited in claim 1 in which said body of elastomeric material contains an essentially annular recess defining said space adjacent said wall.

5. A fluid sealing unit as recited in claim 4 including an element radially confining said body at the location of said recess and axially beyond said lip against flexure radially toward said coacting member.

6. A fluid sealing unit as recited in claim 1 in which said second portion of the body and lip are connected to the radially inner extremity of said flexible wall for forming a seal with a coacting member extending axially through the unit.

7. A fluid sealing unit as recited in claim 1 in which said second portion of the body and lip are connected to the radially outer extremity of said wall, said body having a third portion connected to the radially inner extremity of said flexible wall and restrained by said means against as free axial flexure as said wall and carrying a sealing lip for annularly and slidably engaging a second coacting member extending axially through the unit.

8. A fluid sealing unit as recited in claim 1 in which said restraining means comprise an essentially radially extending backing member, and there are two of said bodies of elastomeric material facing oppositely at opposite sides of said backing member and each having said flexible wall, second and lip portions.

9. A fluid sealing unit as recited in claim 8 in which each of said bodies contains an essentially annular recess defining said space adjacent said wall.

10. A fluid sealing unit as recited in claim 9 in which said recesses in said two bodies are in intercommunication through said backing member.

11. A fluid sealing unit of the character described to be mounted for axial movement within a tubular structure, comprising a hub member, a body of elastomeric material carried by said hub containing a recess and having a portion forming an essentially radially extending axially deflectible elastic wall at one side of said recess to be exposed to pressure fluid at a side facing away from the recess, said body having an essentially annular radially outer portion connected to the radially outer extremity of said wall and carrying a sealing lip annularly and slidably engageable in sealing relation with said tubular structure, and a backing member axially supporting said body at said outer portion thereof but not at said recess, whereby fluid pressure against the body axially flexes said wall portion more than said outer portion of the body, to thereby apply an inward force to said outer portion and the lip tending to counteract the tendency of the body for radial expansion by the fluid pressure.

12. A fluid sealing unit as recited in claim 11 including an essentially annular element disposed about said body at the axial location of said recess and confining the body at that location against radial expansion.

13. A fluid sealing unit as recited in claim 11 including a ring disposed about said body and confining it against radial expansion at the axial location of said recess, said body being annularly bonded in fixed relation to said hub member.

14. A fluid sealing unit of the character described to be mounted for axial movement within a tubular structure, comprising an essentially radially extending rigid backing member, two bodies of elastomeric material at opposite axial sides of said backing member, each of said bodies containing a recess and having a portion defining an essentially radially extending axially flexible wall at one side of the recess and exposed to pressure fluid at a side away from the recess, each of said bodies having a radially outer portion outwardly of said recess carrying a sealing lip annularly engageable in sealing relation with said tubular structure, said outer portions of said bodies extending axially toward said backing member and being axially supported thereby, whereby fluid pressure against either of said bodies axially deflects said flexible wall portion thereof more than said outer portion, to thereby apply an inward force to said outer portion and the lip tending to counteract the tendency for radial expansion by the fluid pressure.

15. A fluid sealing unit as recited in claim 14 in which said recesses in the two bodies are essentially annular and adjacent said backing member, and said backing member contains aperture means placing the recesses in the two bodies in intercommunication.

16. A fluid sealing unit as recited in claim 14 including a substantially rigid ring disposed about said bodies axially between said sealing lips thereof and confining the bodies between the lips against radial expansion.

17. A fluid sealing unit as recited in claim 16 including a rod extending axially through said bodies and backing member, and two tubular hub elements carried about said rod at opposite axial sides of said backing member and bonded to inner portions of said bodies respectively.

18. A fluid sealing unit as recited in claim 17 in which said recesses in the two bodies are essentially annular and adjacent said backing member, and said backing member contains aperture means placing the recesses in the two bodies in intercommunication.

19. A fluid sealing unit as recited in claim 1 in which said body of elastomeric material contains an essentially annular recess defining said space adjacent said wall, said second portion of the elastomeric body having a part extending axially adjacent said recess and formed of a less flexible material than said wall.

20. A fluid sealing unit of the character described for forming an annular seal with a coacting member relative to which the unit is axially movable, said unit comprising two bodies of elastomeric material at opposite sides of the unit and each having a portion forming an essentially radially extending elastic wall to be exposed at one side to pressure fluid, there being a space at the opposite side of each wall allowing axial flexure of the wall by said pressure fluid, each of said bodies having a second portion connected to one radial extremity of said wall and carrying a sealing lip, said lips of said two bodies being adapted to annularly and slidably engage a surface of said coacting member at two axially offset locations, and means restraining axial flexure of said second portion of each body to an extent such that said second portion is less free than said wall for axial flexure, whereby said wall when axially flexed by the pressure fluid tends to apply a radial force to said second portion of the body in a direction away from said coacting member to thereby counteract the tendency of the body to be pressed radially against the member by the fluid, there being internal passage means through said unit for passing a liquid to a space between said unit and said coacting member at a location axially between said sealing lips.

21. A fluid sealing unit as recited in claim 20, in which said unit is a piston and said coacting member is a cylinder, said lips being formed on radially outer portions of said elastic bodies.

References Cited in the file of this patent

UNITED STATES PATENTS

| | | |
|---|---|---|
| 822,053 | Jones | May 29, 1906 |
| 1,248,263 | Cloude | Nov. 27, 1917 |
| 1,626,614 | Kibele | May 3, 1927 |
| 1,662,725 | Toney | Mar. 13, 1928 |
| 1,721,737 | Joyce | July 23, 1929 |
| 1,818,187 | Bailey | Aug. 11, 1931 |
| 2,417,504 | Knaggs et al. | Mar. 18, 1947 |

FOREIGN PATENTS

| | | |
|---|---|---|
| 8,129 | Austria | July 10, 1902 |